Dec. 7, 1954   J. M. KEMPER   2,696,153
PRESSURE CONTROL MECHANISM
Filed Feb. 24, 1949
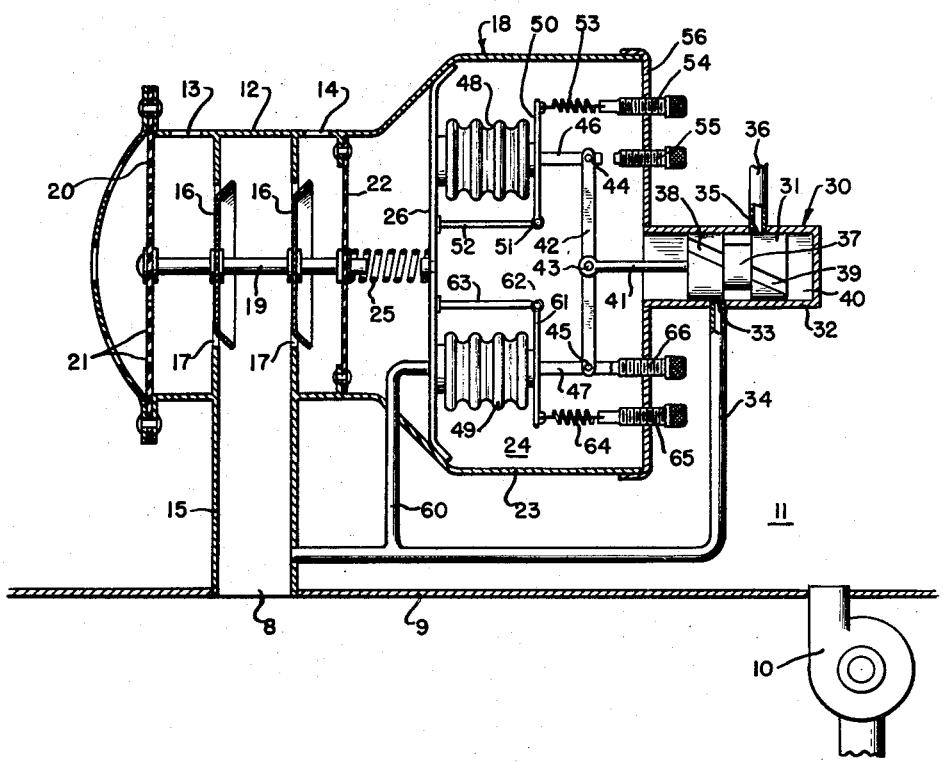
INVENTOR.
JAMES M. KEMPER
BY
ATTORNEY United States Patent Office 2,696,153
Patented Dec. 7, 1954

2,696,153

PRESSURE CONTROL MECHANISM

James Morgan Kemper, Hollywood, Calif., assignor to The Garrett Corporation, Los Angeles, Calif., a corporation of California Application February 24, 1949, Serial No. 78,083

20 Claims. (Cl. 98—1.5)

This invention relates generally to means for controlling a pressurized ventilation of an enclosure, and relates more particularly to means for maintaining desired air pressure within the enclosure.

While the invention has particular utility in connection with pressurized aircraft cabins and the like, and is shown and described embodied in such an installation, it is to be understood that its utility is not confined thereto.

More particularly, the invention will be shown and described in connection with that method of cabin pressurizing wherein the cabin pressure is permitted to remain substantially the same as atmospheric pressure until a predetermined altitude is reached, is maintained at a substantially constant level between that altitude and a second predetermined higher altitude and, above said second predetermined altitude is maintained at a substantially fixed differential relative to external atmosphere.

It is therefore an object of the invention to provide means for thus controlling cabin pressure.

It is another object of the invention to provide a device of this character that is relatively simple in construction and operation and relatively inexpensive to manufacture.

Still another object of the invention is to provide mechanism of this character having a control chamber in which a control pressure is maintained, and said pressure is controlled by mechanism having a single valve for controlling the inflow and/or outflow of air from said control chamber.

It is still another object of the invention to provide a device of this character wherein there is a smooth transition from unpressurized to the isobaric pressurized operation and a smooth transition from the isobaric pressurized operation to the differential pressurized operation and vice versa.

A further object of the invention is to provide a device of this character which may be a self-contained unit capable of being furnished as a packaged article.

A still further object of the invention is to provide a device of this character which is capable of operation in conjunction with a device for adjusting the cabin pressure to correspond to that existing at the altitude of a landing field.

Another object of the invention is to provide a device of this character adapted for operation in connection with a device for adjusting the cabin pressure in the differential range from one predetermined differential to another.

Toward the attainment of the foregoing objects, the invention contemplates a pressure regulator embodying valve means for handling the outflow of air from the cabin under all operating conditions, and operated by a means which is responsive to the differential between the pressure of the air being passed by said valve means and the air in a control chamber which is under the control of pressure sensitive valve means which, in its control operation, is required to handle only a small quantity of air as compared to that handled by the flow control valve.

Further objects and advantages of the invention will be brought out in the following part of the specification.

In the drawing, which is schematic in character and for illustrative purposes only, there is shown a pressurized system embodying the present invention, reference numeral 8 indicating an outlet in a wall 9 of an aircraft cabin, the air being introduced into said cabin under pressure by means of a supercharger 10 or other suitable apparatus.

The pressure regulator is adapted to be disposed within the cabin 11 and embodies a valve casing 12 into which cabin air flows through openings 13 and 14. It has an outlet duct 15 for discharging such air to the cabin outlet 8, a pair of valve elements 16 controlling valve apertures 17 through which the air may flow from the valve casing 12, through the duct 15 and through the outlet 8, the controlling mechanism of the pressure regulator being indicated generally at 18.

The valves 16 are carried by a shaft 19 which is supported by a flexible support member 20 (comprising one or more spiralled webs separated by slots 21) and a diaphragm 22. The diaphragm 22 is suitably secured adjacent one end of the casing 12 which is enlarged at 23 and which cooperates with the diaphragm 22 to define a control chamber 24 in which is maintained a pressure normally a trifle lower than the pressure in the cabin. The diaphragm 22 responds to differentials arising between substantial cabin pressure, which is exerted against the left side thereof (as viewed in the drawing) and the pressure of the air in the control chamber 24 supplemented by the force of a spring 25, exerted against its right side. The end of the spring 25, opposite the diaphragm 22, is supported by a cross member 26 having its ends secured to the housing 23. Any tendency of cabin pressure to drop below the level determined by the pressure in the control chamber 24 will result in movement of the diaphragm 22 in valve closing direction, thus causing the cabin pressure to rise to the proper level. Conversely, any excess of cabin pressure will result in valve opening movement, permitting cabin pressure to drop back to the level determined by the pressure in the control chamber 24.

The pressure in the control chamber 24 is determined by pressure responsive means adapted to bleed air into or out of said chamber 24, there being a single valve means, indicated generally at 30, for controlling said bleeding of air. The valve means shown comprises a movable valve member 31 slidable within a cylinder 32 which has a port 33 with a conduit connection 34 to a region of pressure lower than that in chamber 24 and shown as atmosphere. The cylinder 32 also has a port 35 with a connection 36 to a source of pressure higher than that in chamber 24, said source being shown as the cabin. The port 35 is spaced axially or longitudinally outwardly relative to the port 33, and the valve member 31 is provided with an annular groove 37 intermediate the ends thereof. The annular groove is of a width slightly less than the axial distance between the adjacent sides of the ports 33 and 35, so that when the valve is in an intermediate position with respect to said ports, both of said ports will be cut off from connection with said groove 37. However, slight movement in either direction will cause the groove 37 to come into communication with one or the other of said ports. The groove 37 is connected with the chamber 24 by means of a passage 38 which extends from said groove to the inner end of the valve member 31. The annular groove 37 also has a connection 39 with the opposite end of said valve member 31 so that the chamber 40 at the outer end of the cylinder 32 will not become air-bound and the pressure at opposite ends of the valve member 31 is equalized.

The valve member 31 is provided with a stem 41 which extends from the inner end of said valve member into the chamber 24. The inner end of the stem 41 is pivotally mounted to a lever or beam 42 intermediate the ends of said beam, as indicated at 43. The beam 42 has pivotal connections 44 and 45, adjacent the respective ends thereof, with stems 46 and 47 of pressure sensitive devices 48 and 49.

The pressure responsive device 48 is shown as an evacuated collapsible bellows and comprises an absolute pressure responsive device. One end of the bellows 48 is attached to the cross member 26, and hence is fixed, the other or movable end of said bellows carrying the stem 46. A lever 50 is secured adjacent the movable end of the bellows 48 and is pivoted at 51 to a fixed support 52, the support 52 being secured to the cross member 26 adjacent the end opposite the pivot 51. The opposite end of the lever 50 is connected to one end of a spring 53. The opposite end of the spring 53 is secured to adjusting screw 54 whereby the tension of said spring 53 may be varied. An adjustable stop, shown as a screw 55, is provided in the end wall 56 of the housing 23 and provides stop means against which the stem 46 of the bellows 48 may abut to limit the expansion of said bellows 48.

The pressure responsive device 49 is shown as comprising a bellows exteriorly subjected to the pressure of air within the control chamber 24, the interior of said bellows 49 being connected by means of a conduit 60 to the conduit 34 so that the interior of said bellows is subjected to atmospheric pressure. The bellows 49 is therefore a differential pressure responsive device responsive to the differential of pressure between that in the control chamber and atmosphere.

The end of the bellows 49 carrying the stem 47 is movable, the other end of said bellows being secured to the cross member 26. A lever 61 is secured to the movable end of the bellows 49 and is pivoted at 62 to a support 63 having its opposite end secured to the cross member 26. The free end of the lever 61 has one end of a spring 64 secured thereto, the opposite end of said spring being secured to adjustable means shown as comprising a screw 65 threaded into an opening provided therefor in the wall 56. Adjustable stop means is provided to limit the expansion of bellows 49 and is shown as comprising a screw 66 threadably received in an opening provided therefor in the wall 56 and engageable by the adjacent end of the stem 47. It is to be understood that up to the differential range of operation the stem 47 is in abutment with the stop 66 and the valve member 31 is so positioned, by the isobaric bellows 48, as to provide communication between the chamber and atmosphere so that cabin pressure is maintained substantially the same as atmospheric pressure until the aircraft attains a predetermined altitude. Thereafter, throughout the isobaric range, the bellows 48 will control the pressure in the chamber 24 so as to maintain cabin pressure at substantially a constant level. At this time the beam or lever 42 has its fulcrum at 45. If there is too much pressure in the chamber 24, the isobaric bellows 48 compresses so as to open the port 33 to atmosphere, thereby bleeding out excessive pressure. If the pressure in the chamber 24 is too low, the bellows 48 expands, opening port 35 which connects the compartment or chamber 24 with the cabin, thereby raising the pressure in said chamber 24. Thus, the bellows 48 maintains the pressure in the chamber 24, and hence in the cabin, at a substantially constant level throughout the isobaric range.

When the differential of pressure between the chamber 24 and atmosphere increases to a predetermined value, the differential bellows 49 is compressed, thereby opening the port 33 which relieves the pressure in the chamber 24. When the pressure in chamber 24 drops, the isobaric bellows 48 expands so that the stem 46 engages the stop means or member 55. Thereafter, when the plane is operated in the differential range, the differential pressure bellows 49 maintains the pressure in the chamber 24 at a substantially constant differential with respect to atmosphere and hence, maintains cabin pressure at a corresponding or similar differential pressure. During the time the differential pressure bellows 49 functions to control the pressure in the chamber 24, the pivot 44 serves as a fulcrum for the lever 42.

Should it be desired, the response of the bellows 48 may be varied by mechanism such as shown in applicant's copending application for Cabin Pressure Control System, Serial No. 613,794, filed August 31, 1945, now Patent No. 2,463,489. With this arrangement the tension of the spring 53 is varied so that the pressure in the control chamber, and hence in the cabin, may be gradually varied between a starting airport and a destination airport having different elevations.

The present device is also adapted to have the differential responsive means controlled by mechanism such as shown in applicant's copending application for Cabin Pressure Control System, Serial No. 625,379, filed October 29, 1945, now Patent No. 2,463,490. With this arrangement the differential pressure control mechanism may be so controlled to adjust the cabin pressure in the differential range from one predetermined differential to another.

I claim:

1. Mechanism for controlling the air pressure in an enclosure, including: enclosure pressure control means operable to control the pressure in said enclosure, said pressure control means including a pressure sensitive element; a control chamber having a connection with a source of higher pressure and a region of lower pressure, said pressure sensitive element being exposed to enclosure pressure and control chamber pressure in such a manner that changes in either of said pressures cause a movement of said pressure sensitive element whereby said enclosure pressure control means is operated to control said enclosure pressure; pressure control means for said control chamber, including absolute pressure responsive means responsive to control chamber pressure, and differential pressure responsive means responsive to the differential of pressure between that in the control chamber and said region of lower pressure; and valve means controlling the control chamber connection and adapted, when in one position, to connect the control chamber with said source of higher pressure and when in another position to connect said control chamber with said region of lower pressure, said absolute and differential pressure responsive means being connected to said valve means for controlling same.

2. The invention defined by claim 1, wherein said source of higher pressure is the enclosure and said region of lower pressure is external atmosphere.

3. The invention defined by claim 1, wherein said valve means comprises a single valve.

4. Mechanism for controlling the air pressure in an enclosure, including: enclosure pressure control means operable to control the pressure in said enclosure, said pressure control means including a pressure sensitive element; a control chamber having a connection with a source of higher pressure and a region of lower pressure, said pressure sensitive element being exposed to enclosure pressure and control chamber pressure in such a manner that changes in either of said pressures cause a movement of said pressure sensitive element whereby said enclosure pressure control means is operated to control said enclosure pressure; pressure control means for said control chamber, including absolute pressure responsive means responsive to control chamber pressure, and differential pressure responsive means responsive to the differential of pressure between that in the control chamber and said region of lower pressure; and valve means controlling the control chamber connection and adapted, when in one position, to connect the control chamber with said source of higher pressure and when in another position to connect said control chamber with said region of lower pressure only, said absolute and differential pressure responsive means being connected in parallel to said valve means for controlling same.

5. Mechanism for controlling the air pressure in an enclosure, including: enclosure pressure control means operable to control the pressure in said enclosure, said pressure control means including a pressure sensitive element; a control chamber having a connection with the enclosure and with atmosphere, said pressure sensitive element being exposed to both enclosure pressure and control chamber pressure in such a manner that changes in either of said pressures cause a movement of said pressure sensitive element whereby said enclosure pressure control means is operated to control said enclosure pressure; pressure control means for said control chamber including absolute pressure responsive means responsive to control chamber pressure, and differential pressure responsive means, responsive to variations in the differential of pressure between that in the control chamber and atmosphere; a valve including a movable valve member for controlling the control chamber connection, said valve, when in one position connecting the control chamber with the enclosure, when in another position connecting said control chamber with atmosphere, and when in an intermediate position cutting off the control chamber from both the enclosure and atmosphere; a beam pivotally interconnecting the absolute and differential pressure responsive means, the connections between said pressure responsive means and the beam being adjacent the respective ends of said beam; a connection between the movable valve member and said beam intermediate the ends thereof, said connection at the beam being a pivotal connection; stop means for each of the pressure responsive means for limiting the movement thereof in one direction; and adjustable yielding means for each of said pressure responsive means for adjusting the response thereof.

6. In an enclosure pressure control mechanism having a control pressure chamber; a two-way valve for connecting the control pressure chamber to a relatively high pressure source or a relatively low pressure source other than enclosure pressure; an absolute pressure responsive device; a differential pressure responsive device; means interconnecting said pressure responsive devices and also directly connecting same to said valve for positively actuating said valve in both directions; and means for rendering one of said pressure responsive devices inoperative when the other of said devices is operative and vice versa.

7. In pressure control mechanism having a control pressure chamber: two-way valve means for connecting the control pressure chamber to a relatively high pressure source or a relatively low pressure source; an absolute pressure responsive device having a movable wall; a differential pressure responsive device having a movable wall; a beam pivotally and positively connecting said movable walls; a positive connection between said valve means and said beam, said connection to said beam being between the points of connection of said beam with said walls; and stop means for each of said walls for limiting the movement thereof in one direction.

8. In pressure control mechanisms having a control pressure chamber: connection means for connecting said control pressure chamber with a source of higher pressure and a region of lower pressure; valve means for controlling said connection means; said valve means including a movable valve member which, when in one position, is adapted to connect the control chamber with said source of higher pressure, when in another position, is adapted to connect said chamber with said region of lower pressure, and which, when in an intermediate position, is adapted to cut off said chamber from both said source of higher pressure and region of lower pressure; absolute pressure responsive means; differential pressure responsive means; and means interconnecting said pressure responsive means, said interconnecting means having a part connected with said movable valve member.

9. Pressure control mechanism, including: wall means defining a control pressure chamber; valve means for controlling the flow of air through an opening including a movable pressure sensitive control element adapted to be subjected on one side to a pressure to be controlled and on the other side to control chamber pressure; pressure control means for said control chamber including a valve having one position for connecting the control chamber with a source of higher pressure and another position for connecting said chamber with a region of lower pressure, pressure responsive means responsive to control chamber pressure, a second pressure responsive means responsive to the differential between control chamber pressure and the varying reference pressure, means positively interconnecting the pressure responsive means and the valve, and means for rendering one of the pressure responsive means inoperative when the other of said pressure responsive means is operative and vice versa; and adjustable means for varying the response of one of said pressure responsive means.

10. Pressure control mechanism, including: wall means defining a control pressure chamber; valve means for controlling the flow of air through an opening including a movable pressure sensitive control element adapted to be subjected on one side to a pressure to be controlled and on the other side to control chamber pressure; pressure control means for said control chamber including a valve having one position for connecting the control chamber with a source of higher pressure and another position for connecting said chamber with a region of lower pressure, pressure responsive means responsive to control chamber pressure, a second pressure responsive means responsive to the differential between control chamber pressure and the varying reference pressure, means positively interconnecting the pressure responsive means and the valve, and means for rendering one of the pressure responsive means inoperative when the other of said pressure responsive means is operative and vice versa; and adjustable means for each of said pressure responsive means for varying the response of said means respectively.

11. Pressure control mechanism including: walls defining a control pressure chamber; a movable pressure sensitive control element adapted to be subjected on one side to a pressure to be controlled and on the other side to a control chamber pressure; pressure control means for said control chamber including a pair of pressure responsive means each of which has one side subjected to control chamber pressure; valve means having one range of movement for variably connecting the control chamber with a source of higher pressure and another range of movement for variably connecting said chamber with a region of lower pressure; means interconnecting said pressure responsive means and said valve means; and means for rendering one of said pressure responsive means inoperative when the other of said pressure responsive means is operative and vice versa.

12. Pressure control mechanism, including: a wall defining a control pressure chamber; a movable pressure sensitive control element adapted to be subjected on one side to a pressure to be controlled and on the other side to control chamber pressure; pressure control means for said control chamber, including an absolute pressure responsive device and a differential pressure responsive device; a single movable valve member having one position for connecting the control chamber with a source of higher pressure only and another position for connecting said control chamber with a region of lower pressure only; means interconnecting said pressure responsive device and said valve member; and means for rendering one of said pressure responsive devices inoperative when the other of said pressure responsive devices is operative and vice versa.

13. Pressure control mechanism, including: wall defining a control pressure chamber; a movable pressure sensitive control element adapted to be subjected on one side to a pressure to be controlled and on the other side to control chamber pressure; pressure control means for said control chamber including a pair of pressure responsive means; a single movable valve member having one range of movement for variably connecting the control chamber with a source of higher pressure only and another range of movement for variably connecting said chamber with a region of lower pressure only; means interconnecting said pressure responsive means and said valve member; and means for rendering one of said pressure responsive means inoperative when the other of said pressure responsive means is operative and vice versa.

14. Pressure control mechanism, including: walls defining a control pressure chamber; a movable pressure sensitive control element adapted to be subjected on one side to a pressure to be controlled and on the other side to control chamber pressure; pressure control means for said control chamber including a pair of pressure responsive means; a single movable valve member having two positions for selectively connecting the control chamber with respectively a source of higher pressure and a region of lower pressure; means interconnecting said pressure responsive means and said valve member; and means for rendering one of said pressure responsive means inoperative when the other of said pressure responsive means is operative and vice versa.

15. In mechanism for controlling the pressure in the control chamber of a pressure regulator, comprising: a two-way valve for controlling the flow of fluid relative to said control chamber, said valve having one position connecting the control chamber with a region of higher pressure and having another position connecting said chamber with a region of lower pressure; a pair of pressure responsive means each of which has a movable wall responsive to control chamber pressure; means interconnecting said movable walls and said valve; and means for rendering one of said pressure responsive means inoperable when the other of said pressure responsive means is operative and vice versa.

16. In a pressure control mechanism for the control chamber of a pressure regulator: connection means for connecting said control pressure chamber with a source of higher pressure and a region of lower pressure; valve means for controlling said connection means, said valve means including a movable valve member through which pressure is transmitted having one range of movement for variably connecting the control chamber with said source of higher pressure, another range of movement for variably connecting said chamber with said region of lower pressure and an intermediate position whereat said chamber is cut off from both said source of higher pressure and region of lower pressure; absolute pressure responsive means; differential pressure responsive means; and means interconnecting said pressure responsive means, said interconnecting means having a part connected with said movable valve member.

17. Pressure control mechanism, including walls defining a control pressure chamber; a movable pressure sensitive control element adapted to be subjected on one side to a pressure to be controlled and on the other side to control chamber pressure; pressure control means for said control chamber including a two-way valve for connecting the control pressure chamber to a relatively high pressure source or a relatively low pressure source and a pair of pressure responsive means having one side subjected to control chamber pressure, one of said pressure responsive means being an absolute pressure responsive means and the other of said pressure responsive means having its opposite side subjected to atmospheric pressure; means positively interconnecting said pressure responsive means and said valve; and means for rendering one of said pressure responsive means inoperative when the other of said pressure responsive means is operative and vice versa.

18. Pressure control mechanism including: walls defining a control pressure chamber; a movable pressure sensitive control element adapted to be subjected on one side to a pressure to be controlled and on the other side to control chamber pressure; pressure control means for said control chamber including a pair of pressure responsive means each of which has one side subjected to control chamber pressure, one of said pressure responsive means being evacuated and the other having its other side subjected to atmospheric pressure; valve means having one position for connecting the control chamber with a source of higher pressure and another position for connecting said chamber with a region of lower pressure; means interconnecting said pressure responsive means and said valve means; and means for rendering one of said pressure responsive means inoperative when the other of said pressure responsive means is operative and vice versa.

19. Pressure control mechanism, including: walls defining a control pressure chamber; a movable pressure sensitive control element adapted to be subjected on one side to a pressure to be controlled and on the other side to control chamber pressure; pressure control means for said control chamber including a two-way valve for connecting the control pressure chamber to a relatively high pressure source or a relatively low pressure source and a pair of pressure responsive devices having exterior and interior sides respectively, one side of each of said devices being subjected to control chamber pressure, the other side of one of said devices being subjected to a substantially constant reference pressure and the other side of the other of said devices being subjected to a variable reference pressure; means positively interconnecting said pressure responsive devices and said valve; and means for rendering one of said pressure responsive devices inoperative when the other is operative and vice versa.

20. Pressure control mechanism, including: walls defining a control pressure chamber; a movable pressure sensitive control element subjected on one side to control chamber pressure and adapted to be subjected on the opposite side to a pressure to be controlled; pressure control means for said control chamber including a two-way valve for connecting the control pressure chamber to a relatively high pressure source or a relatively low pressure source and a pair of pressure responsive devices each having one side subjected to control chamber pressure, the opposite side of one of said devices being subjected to a reference pressure having a different value from that in the control chamber and the other of said devices having its opposite side subjected to a different reference pressure also having a different value than the pressure in said control chamber; means positively interconnecting said pressure responsive devices and said valve; and means for rendering one of said devices inoperative when the other of said devices is operative and vice versa.

References Cited in the file of this patent

UNITED STATES PATENTS

| Number | Name | Date |
|---|---|---|
| 2,396,116 | Noxon | Mar. 5, 1946 |
| 2,413,027 | Maxson | Dec. 24, 1946 |
| 2,424,764 | Marshall | July 29, 1947 |
| 2,450,881 | Cooper | Oct. 12, 1948 |
| 2,463,487 | Widgery et al. | Mar. 1, 1949 |
| 2,473,117 | Widgery et al. | June 14, 1949 |
| 2,484,846 | Paget | Oct. 18, 1949 |
| 2,510,976 | Herrala et al. | June 13, 1950 |
| 2,578,026 | Taylor | Dec. 11, 1951 |
| 2,610,564 | Cooper et al. | Sept. 16, 1952 |